Oct. 15, 1963   J. P. J. ROY   3,106,814
SUPPLEMENTARY FEED ARM FOR A PICKUP BALER
Filed March 8, 1962
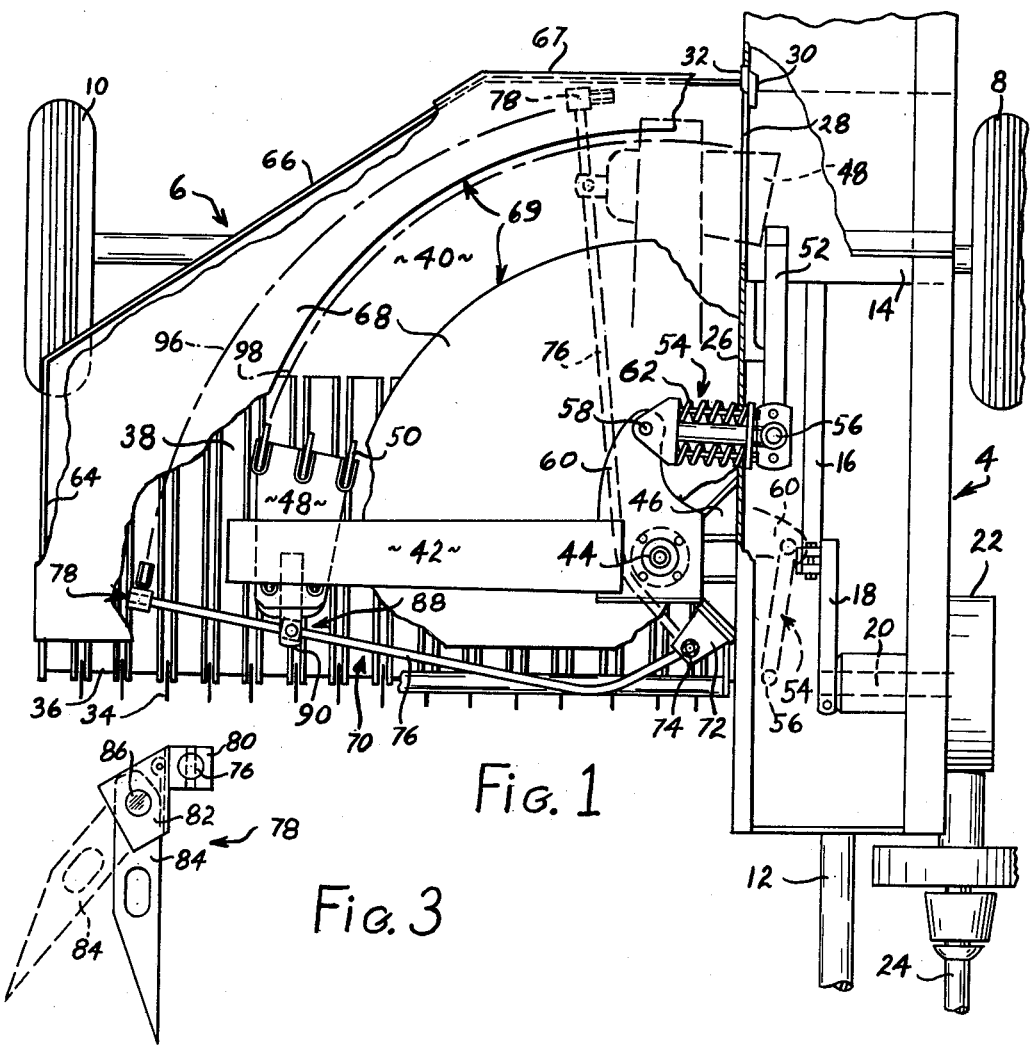
Fig. 1
Fig. 3
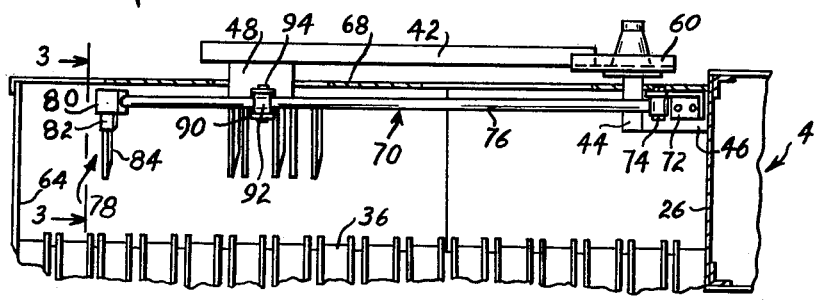
Fig. 2
INVENTOR.
Jacques Roy
BY
Emerson B Donnell
ATTORNEY

United States Patent Office 3,106,814
Patented Oct. 15, 1963

3,106,814
SUPPLEMENTARY FEED ARM FOR A
PICKUP BALER
Jacques P. J. Roy, Vierzon, France, assignor to J. I. Case
Company, Racine, Wis., a corporation of Wisconsin
Filed Mar. 8, 1962, Ser. No. 178,473
Claims priority, application France Mar. 10, 1961
4 Claims. (Cl. 56—341)

The present invention relates to balers, and particularly, to the feeder mechanism of pickup balers, and an object of the invention is to generally improve the construction and operation of devices of this class.

Pickup balers are known in which the crop material is picked up from the ground, deposited on a substantially horizontal feeder deck, and swept over the deck by means of a feeder head carried on a sweep-feed arm which oscillates in a plane generally parallel to the deck and spaced thereabove. The crop material is swept by the head through an opening into the usual baling chamber, and the feeder deck is bounded by upright walls to form a feed chamber. It has been found desirable to provide a substantial space between the end of the feeder or feeder-head assembly and the wall, in order that the head may engage the main body of hay coming in over the pickup, rather than the extreme outer edge thereof, and this arrangement has been generally satisfactory. However, under some conditions, for example when working in short material or under adverse conditions of humidity, material will sometimes accumulate in this clearance space, and it is to avoid this difficulty that the present arrangement has been devised. It is, accordingly, a further object of the invention to provide means for feeding or propelling material tending to lodge in the space beyond the feeder-arm head assembly, and to sweep such material into position to be carried into the baling chamber.

The positioning of the aforesaid walls is such that the clearance space decreases in the direction in which the crop material is fed so that any auxiliary feeding device designed to operate in this clearance space must have a path of movement which will include the mid portion of said clearance space substantially throughout the length thereof, and it is a further object to provide such an auxiliary feeding device and a support or mounting therefor which will impart the desired path of movement thereto.

Further objects are to provide a simple supplementary feeder arm and head of a type which may be readily attached to existing balers, and such a device which will need no elaborate actuating mechanism.

Similar reference characters have been applied to the same parts throughout the following description and accompanying drawings, in which FIGURE 1 is a plan view of so much of a pickup baler as is necessary for an understanding of the invention, parts being removed and others broken away to show what lies beneath.

FIG. 2 is a front view of the same, with parts removed and others broken away.

FIG. 3 is an enlarged elevation of certain mechanism illustrated in FIGS. 1 and 2, substantially on line 3—3 of FIG. 2.

As seen in FIG. 1, the illustrative baler comprises a baling case or chamber generally designated as 4, to which is attached a feeder housing 6, the two forming a frame or general structure on which the other parts can be supported. The baler is carried on ground wheels 8 and 10, and supported at the front, as well as propelled, by a drawbar 12 which is normally secured to a tractor or other draft means, not shown.

Baling chamber 4 has reciprocably supported therein, a baling plunger 14 connected by a pitman 16 with a crank 18 fixed to a crank shaft 20, journaled in a suitable gear housing 22 fixed on baling chamber 4, the shaft being rotated from a power take-off shaft 24 through suitable or well-known mechanism within housing 22, not necessary to further describe; it being understood that rotation of crank 18 will cause to-and-fro movement of plunger 14.

Chamber 4 includes a sidewall 26 which is interrupted to provide a feed opening 28, and which is blocked by plunger 14 in the illustrated position of the parts. When plunger 14 moves forwardly, as when crank 18 moves a half turn from its illustrated position, plunger 14 will move toward the front of the baler, or toward drawbar 12, and clear opening 28 so that crop material may be inserted rearwardly of plunger 14, through opening 28.

A knife 30 on plunger 14 cooperates with a blade or abutment 32 on wall 26 of chamber 4 to shear or cut any material lying within opening 28 and tending to interfere with movement of the plunger.

Crop material destined for opening 28 is picked up by a plurality of pickup fingers 34 which travel upwardly and backwardly in well-known manner between flanged strippers 36, fingers 34 disengaging from the material in about the region designated as 38, so that the crop material is released for further travel as will appear. Strippers 36 terminate preferably slightly above the front end of a feeder deck 40 which is preferably substantially horizontal, and which leads from the region of the ends of strippers 36 to opening 28, crop material being swept along deck 40, and into the opening.

For this purpose, a sweep arm 42 is journaled on a rugged pivot structure 44, in the present instance carried on a bracket 46 rigidly mounted on wall 26 of baling chamber 4, and has a feeder head 48 fixed thereon, spaced from pivot 44. Head 48 has a plurality of crop engaging fingers 50 hingedly connected thereto and extending at least partially, across the space between arm 42 and deck 40 so that rearward or clockwise movement, as seen in FIG. 1, of arm 42 will slide crop material along deck 40 toward opening 28.

Fingers 50 are supported against hinging movement and extend downwardly while head 48 is moving toward opening 28, but are free to be swung upwardly out of the way or into a trailing position by contact with the crop material on deck 40 while head 48 is moving away from opening 28, or is performing a retracting movement. Since this construction is well known, and forms no part of the present invention, it should not need to be further described.

Arm 42 is actuated directly from plunger 14, the latter having a forward extension 52 rigidly fixed thereto to perform reciprocating movements along with plunger 14 in bale case 4. A link, generally designated as 54 has a pivotal connection 58 with an arm 60 rigid with, or forming a part of arm 42. Forward movement of plunger 14 will, therefore, cause movement to the right in FIG. 1 of pivot 58, and swinging of arm 42 in a clockwise direction. Link 54 is relatively short, and in the forwardmost position of plunger 14 will take up approximately the dotted position in FIG. 1, approximately at right angles to its position as shown in full lines. At this time, plunger 14 will be clear of opening 28, while head 48 will have swept a charge of crop material into the space behind plunger 14. In the latter position, arm 60 is in the most favorable position for swinging movement in response to movement of link 54, whereas in the full line position of the parts, movement of plunger 14 merely swings link 54 about pivot 58 without causing appreciable movement of arm 60. The result of the proportions of these parts is to cause head 48 to enter opening 28 and leave very quickly, whereas when head 48 approaches its outward or full line position, shown in FIG. 1, it stops and starts its return gradually. In other words, its stay in the opening 28 is very brief, whereas its stay in the full line position is comparatively long so as to amount substantially to a dwell.

Link 54 is made to telescope in any well-known manner and is held contracted by means of springs 62 which maintain link 54 at a predetermined length under normal conditions. However, in the event that head 48 becomes blocked for any reason, plunger 14 may continue to move, increasing the length of link 54 by compressing springs 62. In this way, danger to the parts is avoided under such abnormal conditions.

Deck 40 is bounded by upwardly directed walls 66 and 67 so that head 48, in effect, travels in a feeding chamber, the crop material being confined generally to a path leading toward opening 28 so that it cannot escape from head 48, particularly beyond the free end of arm 42. The crop material is further confined by a top wall or cover 68 provided with a slot 69 through which head 48 travels. Cover 68 is disposed immediately beneath arm 42 and prevents the crop material from expanding upwardly so as to interfere with the swinging of arm 42. The foregoing structure, while generally very satisfactory, under certain conditions allows the material to accumulate beyond the end of arm 42, which material may, sooner or later, be swept by other incoming material into the path of head 48, and momentarily overload the mechanism, and to avoid this, a supplemental feeder assemblage, generally designated as 70 is provided.

A bracket or support 72 is ruggedly fixed to above-mentioned bracket 46, and carries a pivot 74 on which is journaled for swinging movement, a supplementary feeder arm 76. Arm 76 extends generally in the same direction as above-mentioned arm 42, but beyond the end thereof, as shown in FIGS. 1 and 2. Furthermore, it is supported below above-mentioned cover 68 rather than above.

Arm 76 has a supplemental feeder head 78, in the present instance comprising a block 80, FIG. 3, fixed on arm 76, and carrying a clevis or hinge portion 82 within which a feeder tooth or finger 84 is hingedly supported on a pin 86. Clevis 82 extends downwardly ahead of finger 84, as related to the travel of the baler, so that finger 84 is prevented from swinging to the right in FIG. 3. Finger 84, however, is free to swing to the left in FIG. 3 to the dotted or trailing position. Movement to the left in FIG. 3 (or upward in FIG. 1) is a feeding movement, the pressure of the crop material tending to hold finger 84 in the full line position. Movement in the other direction will cause finger 84 to swing to the dotted or trailing position, as it slides over crop material already on deck 40. Furthermore, finger 84, because of the abrupt retracting movement of the parts will take the dotted position of FIG. 3 by reason of inertia, even in the absence of pressure from crop material.

Arm 76 is propelled by a connection 88 to head 48. A bracket 90, in the present instance bifurcated, is fixed on head 48 at a level beneath cover 68 and carries a slide block or bearing 92 for free swinging on trunnions 94 journaled in bracket 90. Block 92 has a bore through which arm 76 is freely slidable. Swinging of arm 42, therefore, causes simultaneous swinging of arm 46. By reason of the displacement of pivot 74 from pivot 44, there will be a difference in the path of movement of arm 42, as related to arm 46. This is permitted by sliding of arm 76 through slide block 92.

It is to be noted that, by reason of the displacement of pivot 74, supplementary head 78 travels in a path 96 which is not parallel to the path 98 of head 48. Thus, while head 78 is spaced a substantial distance therefrom in the full line position, it is relatively close to head 48 in the dotted position, or when head 48 is in opening 28. In this position, head 48 approaches wall 67 much more closely than it approaches wall 64, for example, in the full line position, and supplemental head 78 must move closer to head 48 in order to avoid striking wall 67. This action is advantageous in that material propelled by head 78 is released close to the path of head 48, or approximately at the dotted position of head 78, where the material will be caught on the next pass of head 48, or by the mass of material being pushed ahead of head 48, and swept into the baling chamber through opening 28.

In this manner, any appreciable quantity of crop material is prevented from building up in the space beyond head 48, or beyond the end of the arm 42.

The operation of the structure is thought to be clear from the foregoing; sufficient to say that the swinging of arm 42 causes travel of head 48 through slot 70 to propel material along deck 40 into the opening 28. Any material which escapes this action and accumulates beyond the end of arm 42 is engaged by finger 84 of head 78 and carried along to the neighborhood of the dotted position of arm 76 in FIG. 1. From here, it will be swept through opening 38 upon the next pass of head 48. In this manner, clogging, and the accumulation of "slugs" of material in feeder housing 6 is prevented.

What is claimed as new and desired to be secured by Letters Patent of the United States is:

1. In a baler of the type having a sweep feed arm assembly swingable in a substantially horizontal plane; the combination of a pivot structure about which said arm is swingable, means for swinging said arm about said pivot structure, a second pivot displaced from the first-mentioned pivot, a supplementary feeder arm assembly supported on and swingable about said second pivot and lying generally along the first-mentioned arm, and means connecting said arms together at a point spaced from said pivots and constituted to provide for relative lengthwise displacement of said arms resulting from the displacement of said pivots from each other.

2. In a sweep feeder for a baler an upwardly directed pivot supported on the baler, a feeder arm assembly journaled on the pivot for swinging movement, means for swinging the arm assembly, a second upwardly directed pivot laterally spaced from the first pivot, a supplemental arm journaled on said second pivot, extending along said feeder arm assembly and beyond the end thereof, a supplemental feeder head on the supplemental arm beyond the first feeder head as related to the first-mentioned pivot, and slidable bearing means connected between the feeder assembly and the supplemental arm for swinging the supplemental arm by reason of the swinging of the feeder arm assembly.

3. In a pickup baler of the type including a pickup, a feeder housing into which crop material is delivered by said pickup, a baling chamber providing a feeding opening in the side thereof, a baling plunger slidable in the baling chamber so as to cover and uncover said opening, and means for reciprocating the baling plunger; the combination of a deck extending between said pickup and said opening, upwardly directed walls supported in position to define with said deck a feeding chamber having a front opening, an upwardly directed pivot adjacent and at one side of said front opening, a sweep feeder arm assembly journaled on said pivot in position to swing in a path spaced above said deck, means for oscillating said sweep feed arm, a main feeder head fixed in relation to said sweep feed arm, spaced from said pivot, and in position to approach said feeding opening as a result of swinging of said sweep feed arm, said feeder head traveling in spaced relation to said walls, a second upwardly directed pivot supported forwardly of the first upwardly directed pivot, a supplementary feed arm journaled on said second upwardly directed pivot and extending generally along the length of said sweep feed arm and into the space between said feeder head and said upwardly directed walls, a supplemental feeder head fixed in relation to said supplementary feed arm in position to travel in said space between said feeder head and said upwardly directed walls, a finger connected to said supplemental feeder head and movable from a downwardly directed position during movement of said feeder heads in one direction, and into trailing position during movement of said feeder heads in the other direction, and means connected between said feeder arm assembly and said supplementary feed arm whereby oscillation of said feeder arm assembly will cause synchronous oscillation of said supplementary feed arm and travel of said supplemental feeder head in said space between said main feeder head and said upwardly directed walls.

4. In a baler of the type having a feeder housing, a baling chamber providing a feeding opening, a baling plunger slidable in the baling chamber, and means for reciprocating the baling plunger; the combination of a deck extending to said opening, upwardly directed walls supported in position to define with said deck a feeding chamber having a front opening, a sweep feeder arm assembly swingable in a path spaced above and generally parallel to said deck and spaced from said upwardly directed walls, means for oscillating said sweep feeder arm, supplementary feeding means swingable in a path spaced between said upwardly directed walls and the path of said sweep feeder arm, and means for swinging said supplementary feeding means.

References Cited in the file of this patent

UNITED STATES PATENTS

| | | |
|---|---|---|
| 2,487,938 | Nikkel | Nov. 15, 1949 |
| 2,572,180 | Morrison | Oct. 23, 1951 |
| 2,627,714 | Freeman et al. | Feb. 10, 1953 |
| 2,720,073 | Freeman et al. | Oct. 11, 1955 |